May 15, 1923.
B. L. SMITH
1,455,453
CUSHION WHEEL FOR MOTOR VEHICLES
Filed July 16, 1921   2 Sheets-Sheet 1
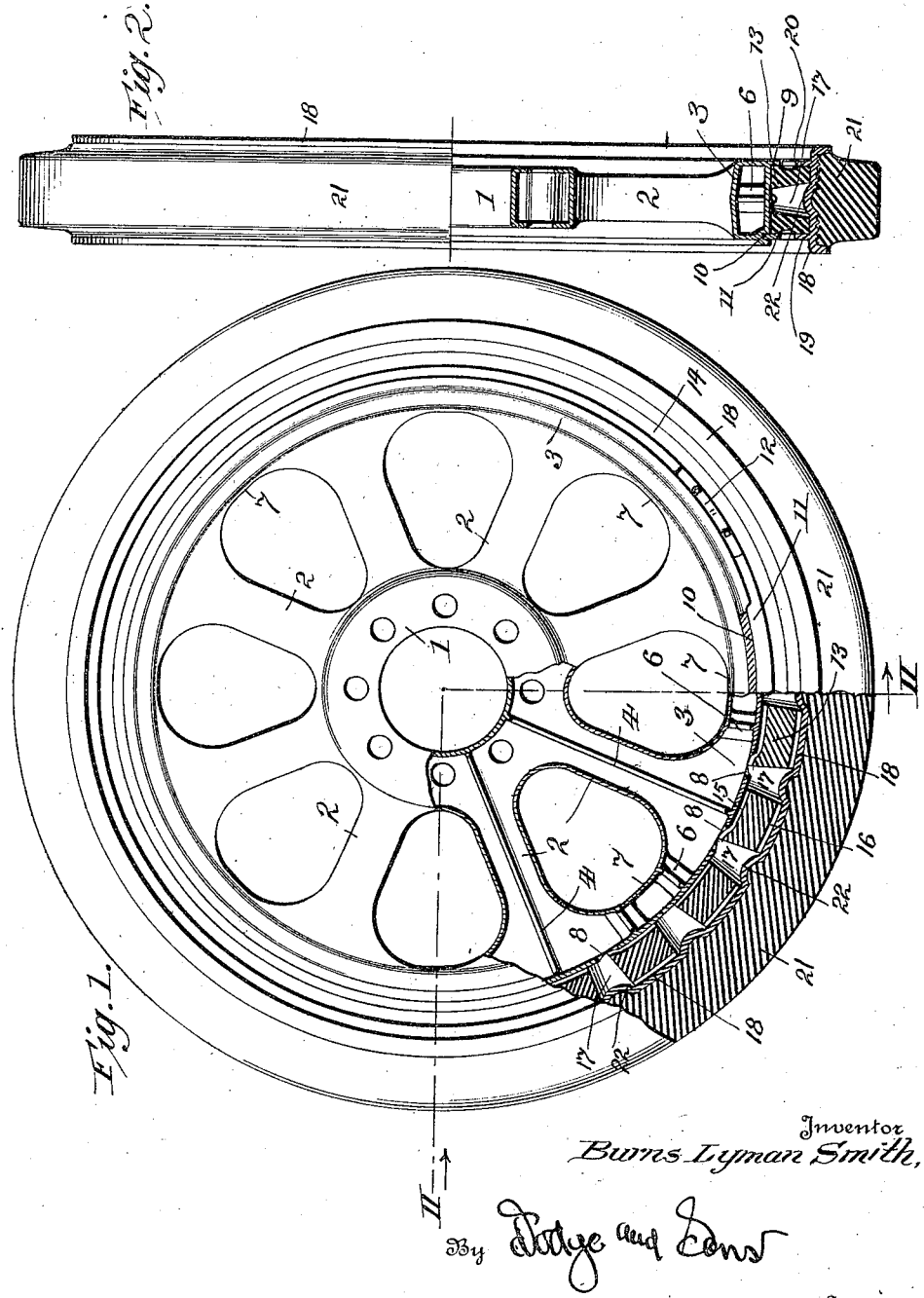
Inventor
Burns Lyman Smith,
By Dodge and Sons
Attorneys.

May 15, 1923.
B. L. SMITH
1,455,453
CUSHION WHEEL FOR MOTOR VEHICLES
Filed July 16, 1921  2 Sheets-Sheet 2
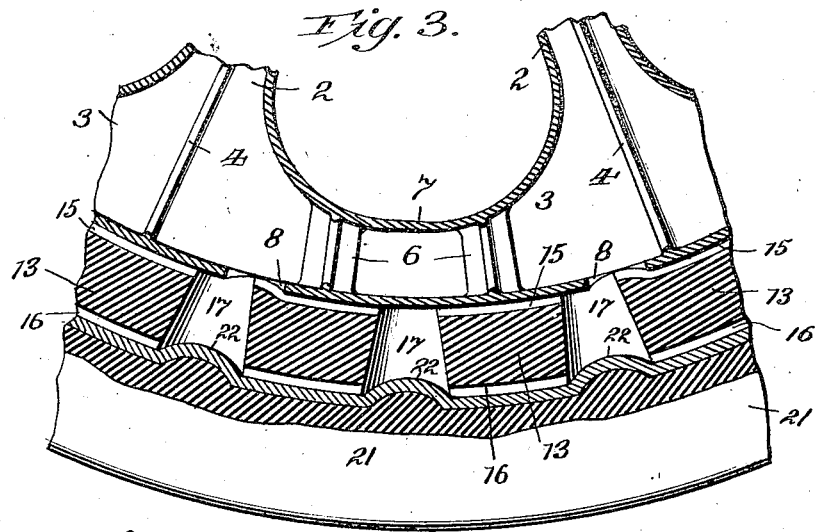
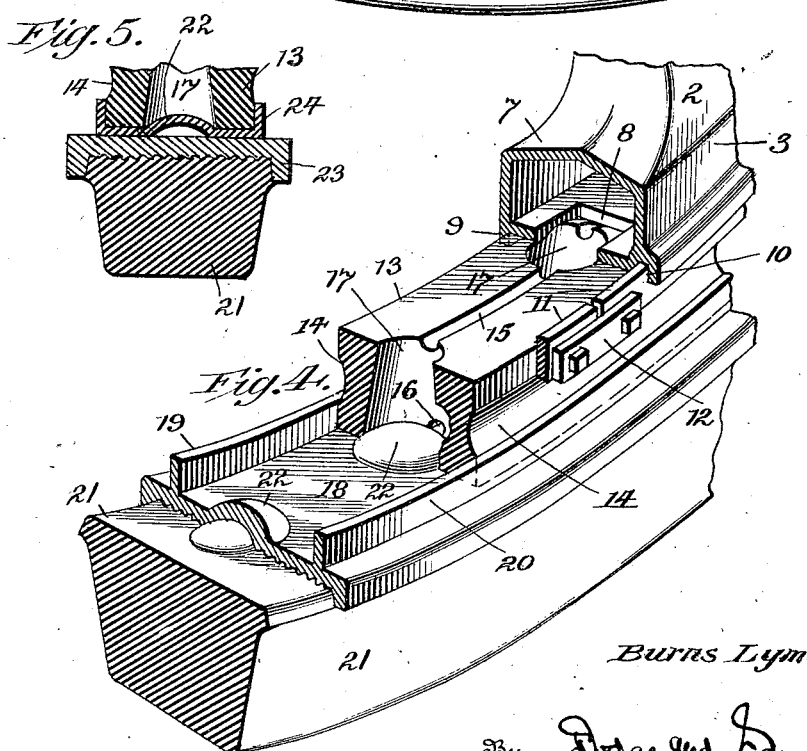
Inventor
Burns Lyman Smith,
By Dodge and Sons,
Attorneys Patented May 15, 1923.

1,455,453

UNITED STATES PATENT OFFICE.

BURNS LYMAN SMITH, OF SYRACUSE, NEW YORK.

CUSHION WHEEL FOR MOTOR VEHICLES.

Application filed July 16, 1921. Serial No. 485,157.

*To all whom it may concern:*

Be it known that I, BURNS L. SMITH, a citizen of the United States, residing at Syracuse, in the county of Onondaga and State of New York, have invented certain new and useful Improvements in Cushion Wheels for Motor Vehicles, of which the following is a specification.

This invention pertains to cushion tires and has reference more particularly to those which are especially designed for heavy duty, as, for instance, upon motor driven trucks.

With the tendency toward the increase in size of trucks, and the consequent increase in weight imposed upon the wheels and tires, said members, and more particularly the tires, are subjected to considerable strain and wear. Large size pneumatic tires have been employed to some extent but their utilization is open to numerous objections well known to those skilled in the art. Various forms of cushion tires have also been proposed and some few have met with a given measure of success.

The present invention seeks to overcome some of the more serious difficulties which inhere in the use of cushion tires, and has for one of its objects to provide a combined wheel and tire structure, which while affording sufficient resiliency to absorb the road shocks, is at once simple, efficient and strong. Another object of the invention is to so construct the combined tire and wheel structure that overheating of the tire will be prevented, the construction and arrangement of the parts being such that the wheel body acts as a radiating surface providing a reservoir for a relatively large volume of air which is caused, by the action of the tire element, and through the rotation of the wheel, to traverse the cushion element and likewise the wheel structure proper.

A still further object is to provide special means for securing the cushioning element in place upon the wheel and in so doing to utilize a single piece cast wheel, and more particularly, the core openings which are present in the felly thereof.

With these and other objects in view, reference will be had to the annexed drawings, wherein,—

Fig. 1 is a side elevation, partly in section, of my improved tire and wheel;

Fig. 2 a sectional elevation on the line of section being indicated by II—II on Fig. 1;

Fig. 3 a sectional view on a somewhat larger scale than in Fig. 1, of a portion of the wheel and tire;

Fig. 4 a sectional perspective view of a portion of the tire, the wheel felly and the intermediate cushion element; and Fig. 5 a detail sectional view showing a slight modification.

The wheel body is preferably formed as a single casting comprising a hollow hub 1, a series of hollow spokes 2 and a hollow felly 3, all inter-communicating. Suitable webs 4 extend from the side walls of the spokes and other short + shaped webs 6 extend from the felly to the wall 7 which bridge the space between the outer end of the spokes. Core openings 8 are left in the outer face of the felly, said openings standing to either side of the webs 4 in line with the outer open ends of the spokes. This arrangement and formation of the parts produces a single piece wheel structure which at once is strong and durable and which also lends itself to the positioning and securing of the cushioning element thereon. It likewise provides a large reservoir for air and an extended radiating surface. The felly is provided at one side with an integral flange 9 and at its opposite side with a groove 10 for the reception of a removable flange or ring 11, the ends whereof are secured together in any suitable manner, as by a plate 12 overlapping the ends of the ring, and secured thereto. Said flanges, with the outer face of the felly, effect a channel for the reception of the cushioning element. Said element is formed of rubber and is preferably produced as a continuous ring 13 the side walls whereof may have concavities 14 formed therein. The inner and outer faces of the cushioning element are provided with grooves 15 and 16, respectively, and extending radially through the body of the element are openings 17. Said openings are preferably circular in cross section and widen out toward the outer face of the cushioning element. The outer peripheral portion of said element bears and is seated upon a channel member 18, the inwardly projecting flanges 19 and 20 of which embrace the sides of the cushion. Said channel member, which may be said to be a duplex channel, has secured to its outer channel face, as by vulcanizing, a solid tire 21 of any approved type. The body of the channel will preferably be formed with inwardly extending protuberances, as 22, adapted to enter the outer ends of the openings 17, such interengagement serving to prevent creepage between the flange and the cushioning element.

In assembling the parts the cushioning element is placed under compression and by reason thereof portions of the same will be forced inwardly into the core openings 8 in the felly, care being taken, however, in the positioning of the parts that the opening will not be entirely closed. In other words, the openings 8 and 17 are brought into a partial overlapping position and while the flow of the cushioning element into the openings 8 causes an interengagement between the cushion and felly and thus assists in preventing the creeping of the cushion on the felly, the openings 8 are not entirely closed against the passage of air. The initial positioning compression of the cushioning element also produces a measurable interlock between the openings 17 and the protuberances 22. With the parts thus positioned and assembled, it will be seen that the air space within the single piece wheel is in direct communication with the cushion element 13 and through the grooves 15 and 16 and the connecting openings 17 with the inner face of the channel element 18.

The compression of the cushioning element under load, or at least that part thereof which is adjacent the ground, and the consequent expansion of the diametrically opposed portion, tends to set up a flow or movement of the air in the grooves and openings and likewise through the hollow elements of the wheel, namely, the felly, the spokes and the hub. Inasmuch as said wheel elements present an extended metallic surface, the heat generated in the tire and cushion and absorbed by the air will be abstracted by the metallic wheel surfaces, thus preventing overheating of the cushion and its allied parts.

The flow of the air through the parts is also, in a measure, assisted by the turning of the wheel. That is to say, a certain centrifugal force may be set up which causes the air to flow through the wheel structure and the channels and openings in the cushioning element and thus the air is kept in constant agitation and brought into intimate contact with the wheel structure.

In Fig. 5 a slight modification is shown. In this instance the outer tire 21 is mounted in a channel member 23 of the usual form, and the same is forced on to a separate channel member 24 mounted upon the outer circumferential face of the cushion element 13. Said cushion element will have the same form and contour as that heretofore described.

Under both constructions it will be seen that the cushion element and the tire can not be stripped from the felly or wheel structure when side thrust is imposed upon the tire or the wheel, as the case may be, this by reason of the fact that the cushioning element is firmly held between two opposed channel shaped members. Being under initial compression, brought about in the act of assembling the parts, the cushion is held firmly to its place, and, further, by reason of the interlock between the parts, as above described, any tendency to strip the cushion laterally from its position upon the felly is also resisted.

What is claimed is,—

1. In combination with a hollow metallic wheel having core openings in the face of the felly; a cushion element imposed thereon under compression, said element having radially disposed openings formed therein, said openings being so disposed that some of them at least will partially coincide with the core openings; and a tire mounted on the cushion element.

2. In combination with a hollow metallic wheel having core openings in the face of the felly; a cushion element imposed thereon, said element having a groove extending about the same upon both its inner and outer faces, and likewise provided with a series of radially disposed openings extending through the same, said openings being so disposed that some of them at least will partially coincide with the core openings; a metallic rim embracing the outer portion of the cushioning element and serving to hold the same under compression; and a tire carried by the rim.

3. In combination with a single piece metallic wheel comprising a hollow hub, hollow spokes and a hollow felly, the spokes opening into the hub and felly, and said felly having core openings formed in the peripheral face thereof; a flange extending outwardly from the felly at one side thereof as an integral extension, the felly likewise having a channel formed therein upon that side opposite the flange; a ring seated and held within the channel; a cushion element having the form of a ring seated upon the felly and held against lateral displacement between the flange and ring, said element being formed with a groove upon both its inner and outer faces, and likewise with a series of radially disposed openings extending therethrough, said openings being so spaced that they overlap in part at least the core openings in the felly; a channel mounted upon the peripheral face of the cushion element and serving to hold said element in a state of compression whereby portions of the element will be forced into the core openings aforesaid to produce an interlock therewith; and a tire mounted on the rim.

4. In combination with a hollow metallic felly having core openings in the peripheral face thereof; a rubber cushion element seated on the felly; a rim or channel member encircling the cushioning element and serving to compress the same and to force the element into locking engagement with the core openings; and a tire mounted upon the rim.

5. In combination with a hollow metallic felly having core openings in the peripheral face thereof; a rubber cushion element seated on the felly; a rim or channel member encircling the cushioning element and serving to compress the same and to force the element into locking engagement with the core openings, said rim having a plurality of inwardly extending projections adapted to seat themselves in the cushioning element; and a tire mounted upon the rim.

6. In combination with a hollow metallic felly having core openings in the peripheral face thereof; a rubber cushion element seated thereon, said element having a series of radially disposed openings extending therethrough; a rim or channel member encircling the cushioning element and serving when the parts are assembled to place said element under compression, thereby forcing portions of the cushioning element into interlocking engagement with the core openings; a series of inwardly directed projections formed on the rim, said projections extending into the outer ends of the radial openings in the cushioning element; and a tire carried by the rim.

7. In combination with a hollow metallic felly having core openings in the periphal face thereof; an outer rim; a rubber cushion element interposed between the felly and rim, said element being held under compression between said parts; and a series of passages formed in the body of the cushion and communicating with the openings in the felly, said passages extending to the rim; and a tire carried by the rim.

8. In combination, hub, spokes and a rim, a cushioning element mounted on said rim having a plurality of air chambers therein, means for providing restricted air passages from said air chambers to the spokes of said wheel, and a tire mounted on said cushioning element.

9. In combination, hub, spokes and rim, a cushioning element, a tire mounted on the cushioning element, a plurality of air chambers in the cushioning element, means on the rim and integral therewith for retaining the cushioning element on one side thereof, a detachable retaining means on the other side thereof, and means for restricting the exit of air from the air chambers when said cushioning element is under pressure.

In testimony whereof I have signed my name to this specification.

BURNS LYMAN SMITH.